(12) United States Patent
Herrmann et al.

(10) Patent No.: US 10,895,475 B2
(45) Date of Patent: Jan. 19, 2021

(54) ANGULAR POSITION SENSOR (71) Applicant: Robert Bosch GmbH, Stuttgart (DE)

(72) Inventors: Ingo Herrmann, Friolzheim (DE); Thomas Buck, Tamm (DE); Fabian Utermoehlen, Leonberg (DE); Andreas Merz, Freiberg am Neckar (DE); Dayo Oshinubi, Rutesheim (DE); Oliver Krayl, Gerlingen (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 15/769,883

(22) PCT Filed: Oct. 13, 2016

(86) PCT No.: PCT/EP2016/074552
§ 371 (c)(1),
(2) Date: Apr. 20, 2018

(87) PCT Pub. No.: WO2017/067840
PCT Pub. Date: Apr. 27, 2017

(65) Prior Publication Data
US 2018/0224301 A1    Aug. 9, 2018

(30) Foreign Application Priority Data

Oct. 22, 2015 (DE) .......................... 10 2015 220 650

(51) Int. Cl.
*G01D 5/22* (2006.01)
*G01D 5/20* (2006.01)
(52) U.S. Cl.
CPC ........... *G01D 5/2258* (2013.01); *G01D 5/204* (2013.01)
(58) Field of Classification Search
CPC .............................. G01D 5/2258; G01D 11/16
See application file for complete search history.

(56) References Cited

U.S. PATENT DOCUMENTS 6,236,199 B1    5/2001 Irle et al.
6,366,078 B1 *  4/2002 Irle ........................ G01D 5/204
                                                    324/207.12
(Continued)

FOREIGN PATENT DOCUMENTS

CN    2894054 Y    4/2007
CN    103259370 A  8/2013
(Continued)

OTHER PUBLICATIONS

International Search Report corresponding to PCT Application No. PCT/EP2016/074552, dated Jan. 17, 2017 (German and English language document) (5 pages).

*Primary Examiner* — Dominic E Hawkins
(74) *Attorney, Agent, or Firm* — Maginot, Moore & Beck LLP (57) ABSTRACT

An angular position sensor includes a stator element with at least three coils, a rotor element rotatably mounted with respect to the stator element, and an evaluation unit configured to determine an angle of rotation between the rotor element and stator element. The rotor element is configured to inductively couple with each of the at least three coils with varying strengths based on the angle of rotation. The evaluation unit is further configured to supply the coils with alternating voltage in a cyclical manner and in sequence, so that a first respective part of the coils is supplied with alternating voltage and a remaining part is de-energized. The evaluation unit is additionally configured, in a cyclical manner in sequence with one or more de-energized coils, to detect at least one of a respective phase and an amount of an induced alternating voltage, and to determine the angle of rotation therefrom.

11 Claims, 7 Drawing Sheets

(56) References Cited

U.S. PATENT DOCUMENTS

| | | | |
|---|---|---|---|
| 6,384,597 B1* | 5/2002 | Irle | G01D 5/204 |
| | | | 324/207.17 |
| 6,566,862 B1* | 5/2003 | Goto | G01D 3/0365 |
| | | | 324/207.16 |
| 7,191,759 B2 | 3/2007 | Lee | |
| 7,276,897 B2* | 10/2007 | Lee | G01D 5/2053 |
| | | | 324/207.17 |
| 8,575,874 B2* | 11/2013 | Dornhof | H02P 6/182 |
| | | | 318/400.17 |
| 9,464,881 B2* | 10/2016 | Lee | G01D 5/204 |
| 2003/0137294 A1* | 7/2003 | Gleixner | G01D 5/2073 |
| | | | 324/207.17 |
| 2008/0272723 A1* | 11/2008 | Rudel | G01D 5/2455 |
| | | | 318/400.39 |
| 2012/0126730 A1 | 5/2012 | Dornhof | |
| 2013/0057263 A1 | 3/2013 | Hosek | |
| 2013/0200884 A1* | 8/2013 | Manabe | G01D 5/2046 |
| | | | 324/207.16 |
| 2014/0131189 A1* | 5/2014 | Gallagher | B01D 3/06 |
| | | | 202/175 |
| 2014/0197766 A1* | 7/2014 | Chabaud | H02K 29/08 |
| | | | 318/400.38 |

FOREIGN PATENT DOCUMENTS

| | | |
|---|---|---|
| DE | 2 725 036 A1 | 3/1996 |
| DE | 10 2006 055 409 A1 | 5/2008 |
| DE | 10 2011 104 293 A1 | 4/2012 |
| DE | 10 2011 088 725 A1 | 6/2013 |
| EP | 0 182 085 A2 | 5/1986 |
| EP | 0 549 285 A2 | 6/1993 |
| EP | 0 909 955 A2 | 4/1999 |
| EP | 1 975 570 A2 | 10/2008 |
| FR | 2 725 036 A1 | 3/1996 |
| WO | 2005/043715 A2 | 5/2005 |
| WO | 2015/115054 A1 | 8/2015 |

* cited by examiner

ANGULAR POSITION SENSOR

This application is a 35 U.S.C. § 371 National Stage Application of PCT/EP2016/074552, filed on Oct. 13, 2016, which claims the benefit of priority to Serial No. DE 10 2015 220 650.5, filed on Oct. 22, 2015 in Germany, the disclosures of which are incorporated herein by reference in their entirety.

The disclosure relates to a rotation-angle sensor with which, for instance, an angle of rotation between a shaft and another component can be determined.

BACKGROUND

In order to measure angles of rotation, rotation-angle sensors, for instance, are known in which a magnet is rotated over an appropriate magnetic-field sensor. The measurement of the magnetic-field vector then permits an inference as to the angle of rotation. Sensors of such a type also react to external magnetic fields that, for instance, are caused by a flow of current through adjacently arranged power cables, and can be very susceptible to interference.

Another type of rotation-angle sensor exploits an eddy-current effect. In this case, a metallic target, for instance, is moved over sensor coils which are supplied with an alternating voltage and induce an eddy current in the target. This leads to a reduction of the inductances of the sensor coils and permits the angle of rotation to be inferred via a change in frequency. For instance, the coils are an integral part of an oscillating circuit, the resonant frequency of which shifts in the event of a change in inductance. However, this type of rotation-angle sensor may exhibit a high cross-sensitivity to installation tolerances (above all, a tilting of the target). The generated frequency can also be disturbed by external electromagnetic fields (injection locking), since working ordinarily proceeds at frequencies within the range of a few tens of MHz.

In addition, rotation-angle sensors based on coupled coils are known from printed publications U.S. Pat. No. 7,191,759 B2, U.S. Pat. No. 7,276,897 B2, EP 0 909 955 B1, U.S. Pat. No. 6,236,199 B1 and EP 0 182 085 B1. In these printed publications, in a single excitation coil an alternating electromagnetic field is built up which couples into several receiving coils and induces a voltage therein in each instance. For the measurement of the angle of rotation, use is made of a rotatably mounted, electrically conductive target which, depending on its angular position, influences the inductive coupling between the excitation coil and the receiving coils.

SUMMARY

Embodiments of the present disclosure can advantageously make it possible to determine an angle of rotation between a shaft and another component in such a manner that external disturbances and/or component tolerances have only little influence on a measurement.

The disclosure relates to a rotation-angle sensor that, in particular, can be employed in an environment with strong electromagnetic interference fields. For instance, the rotation-angle sensor may be used in the engine compartment, or in the vicinity of the engine compartment, of a vehicle, for instance for the purpose of determining a position of a throttle valve, a rotor position of a BLDC motor, a position of a gas pedal, or a position of a camshaft.

According to one embodiment of the disclosure, the rotation-angle sensor comprises a stator element with at least three coils, a rotor element rotatably mounted with respect to the stator element, which is designed to couple inductively with variable intensity, depending on an angle of rotation, with each of the at least three coils or to cover the three coils variably with an induction element, and an evaluating unit for determining the angle of rotation between the rotor element and the stator element. The stator element, which may also carry the evaluating unit (for instance, an IC—that is to say, an integrated circuit—or an ASIC—that is to say, an application-specific integrated circuit), may be arranged, for instance, opposite the end of a shaft on which the rotor element is fastened. The rotor element may carry a target or induction element which is moved jointly with the shaft, covers the coils, and thereby changes the inductance of the coils.

The evaluating unit in this case is designed to supply the coils cyclically in succession with alternating voltage, so that in each instance a first portion of the coils is supplied with alternating voltage, and a remaining portion is left currentless by the evaluating unit. In this context, "currentless" means that the coil in question is not directly supplied with alternating voltage by the evaluating unit. Since all the coils of the rotation-angle sensor couple inductively with the rotor with variable intensity, depending on the angle of rotation, a coupling, depending on the angle of rotation, between the coils also arises. If one or more coils are energized (supplied with alternating voltage), this generates in the other, currentless coils via the inductive coupling an induced alternating voltage which is consequently also dependent on the angle of rotation. In one, two or more of the energized coils an alternating electromagnetic field is generated which, depending upon the position of the rotor element, induces in the other coils or in the other coil a voltage that permits an inference as to the angle of rotation.

In addition, the evaluating unit is designed to ascertain, cyclically in succession, in one or more currentless coils a phase and/or a magnitude of an induced alternating voltage in each instance, and to determine the angle of rotation therefrom. For instance, the evaluating unit can measure the induced voltage in the coils not supplied with alternating voltage. The alternating voltage may be, for instance, a frequency below one MHz, which can avoid an injection locking.

A coil supplied with alternating voltage may be interpreted as a transmitting coil; the currentless coils may be interpreted as receiving coils. In the case of the rotation-angle sensor, the same coils are not always supplied with alternating voltage, and the induced alternating voltages are not always ascertained in the same coils, but rather the coils act cyclically in succession as transmitting coil or receiving coil. Therefore separate measurements can be carried out within a cycle (which has the order of magnitude of one millisecond). If N is the number of coils and M<N is the number of energized coils, N*(N−M) different measurements of magnitude and/or phase can be carried out per cycle. For N=3, this makes six measurements in the case of one energized coil (M=1), and three measurements in the case of two energized coils (M=2). This can make the determination of the rotation angle considerably more accurate than if only the same coils were always to be energized.

According to one embodiment of the disclosure, the evaluating unit is designed in such a manner that at least two coils from the first portion of the coils are supplied simultaneously with differing alternating voltages. For instance, alternating voltages with which the coils from the first portion of the coils are supplied may have differing frequency, differing phase and/or differing magnitude.

The alternating voltages may, for instance, have differing frequencies. In a currentless coil an alternating voltage is then induced that exhibits components of both frequencies, the strength of which depends on the angle of rotation. By a Fourier analysis of the induced alternating voltage, these components can be ascertained, and the angle of rotation can be determined.

At the same frequency the alternating voltages may differ in magnitude and/or phase. Alternating voltages of differing phase induce in a currentless coil an alternating voltage, the magnitude and phase shift of which in relation to the generated alternating voltages are dependent on the angle of rotation.

But it is also possible that two or more coils are supplied with the same alternating voltage.

According to one embodiment of the disclosure, only one coil is supplied with alternating voltage, and in each of the remaining coils a magnitude and/or a phase of an induced alternating voltage is/are ascertained. If the sensor has a total of three coils, one coil can then be energized cyclically, and the voltage in the other two coils can be ascertained or measured.

According to one embodiment of the disclosure, the induced alternating voltage is ascertained in only one coil, and the remaining coils are supplied with alternating voltage. If the sensor has a total of three coils, two coils can then be cyclically energized simultaneously, and the voltage in the third coil can be measured.

According to one embodiment of the disclosure, the evaluating unit is designed to determine an axial spacing between the stator element and the rotor element from the magnitude and/or the phase of the ascertained alternating current(s) or from the magnitude and/or the phase of the induced alternating voltage. In addition to the current angle of rotation, the spacing of the two integral parts can also be determined (for instance, by averaging over time), in order in this way to reduce systematic errors in the determination of the angle.

According to one embodiment of the disclosure, the coils are planar coils. By a "planar coil" in this connection a coil is to be understood, the windings or turns of which all lie substantially in one plane. A planar coil may exhibit, for instance, only 1% of the height of its diameter.

According to one embodiment of the disclosure, the coils are arranged on and/or in a printed circuit board. For instance, the windings or turns may all have been applied onto the two sides of a printed circuit board. In the case of a printed circuit board with several levels, the windings or turns may also extend within the printed circuit board. The printed circuit board may also carry components and/or an IC for the evaluating unit.

According to one embodiment of the disclosure, the coils mutually overlap at least partially in an axial direction. The coils may be arranged in the stator element substantially in one plane (for instance, on or within a printed circuit board), being displaced in relation to one another in the peripheral direction.

Each of the coils may be arranged substantially in a plane orthogonal to the axial direction. The fact that two coils overlap at least partially in the axial direction may be understood in such a way that the two coils overlap at least partially when they are viewed in the axial direction. This may also be understood in such a way that the two coils overlap at least partially in the case of projection in the axial direction onto a plane orthogonal to the axial direction.

According to one embodiment of the disclosure, each of the coils exhibits at least two turns or segments succeeding one another in the peripheral direction. From the axial viewpoint (that is to say, with direction of viewing in the direction of the axis of rotation of the rotor element), the coils may exhibit several loops which, for instance, are arranged successively in the peripheral direction. In this case, a turn or a segment may comprise one or more conductor loops of the coil, which entirely encircle a surface circulated by the coil. The turns may extend in a plane that extends substantially orthogonally to the axis of rotation of the rotor element.

According to one embodiment of the disclosure, each of the coils exhibits at least one first turn and at least one second turn, the at least one first turn and the at least one second turn being oriented in opposite directions. When a coil is supplied with an alternating voltage, it generates an alternating electromagnetic field that at the first turns is oriented (substantially) in a first direction and at the second turns is oriented (substantially) in a second, opposite direction. The first and second directions may extend substantially parallel to the axis of rotation of the rotor element.

The alternating fields generated by the coil induce currents in the rotor element (depending on the position of the rotor element), which, in turn, generate alternating fields which interact with the coil or, to be more exact, with the turns thereof and consequently change the inductance.

An external electromagnetic field that acts on the coil and that extends substantially homogeneously through two oppositely oriented turns generates currents in the coil that substantially cancel each other out (given equal inductance of the turns). In this way, external interference fields can be compensated.

According to one embodiment of the disclosure, first turns and second turns of a coil are arranged alternately to one another in the peripheral direction of the stator element. In this way, for each coil a chain of turns arises which are oriented succeeding one another in counter-circulating manner.

According to one embodiment of the disclosure, the surface area circulated by the first turns is equal to a surface area circulated by the second turns. If each of the turns has the same number of conductor loops, this has the result that substantially homogeneous interference fields are already suppressed by the coil. In this regard, it is possible that one or more coils have differently-sized turns.

According to one embodiment of the disclosure, turns of a coil circulate surface areas of differing sizes. In the case of several turns per coil, it is also possible that the coils have differently-sized turns, so that, although the coils overlap, the turns are arranged offset relative to one another.

According to one embodiment of the disclosure, turns of the coils are arranged offset relative to one another. As a result, the rotor element or an induction element located thereon covers the at least partially overlapping turns of various coils with variable intensity, so that differing inductances of the coils in question arise.

According to one embodiment of the disclosure, the coils are arranged within merely an angular range of the stator element. For instance, the coils may be arranged around the midpoint of the axis of rotation of the rotor element, offset relative to one another by $\alpha/N$ (N=number of coils, $\alpha$=sensing range of the sensor, $<=360°$). It is also possible that the coils overlap completely and merely their turns are arranged offset relative to one another.

According to one embodiment of the disclosure, each of the coils completely encircles the stator element. All the coils may be arranged around the stator element either along an arc of a segment of a circle ($<360°$) or along a full circular arc (=360°). It should be understood that in this case a surface area that is circulated by the coil does not have to cover the axis or the center of the stator element. That is to say, the coil may be arranged merely in a marginal region of the stator element. For instance, the coils may be arranged along a segment of a circular arc (of about 120°), no coils being located on the complementary segment of a circular arc (for instance, the remaining 240°).

According to one embodiment of the disclosure, the rotor element exhibits at least one induction element or target which is arranged within an angular range of the rotor element. In other words, the induction element only partially circulates the rotor element. Just like the coils, the induction element may be provided merely in a marginal region of the rotor element. The induction element may be a metallic target which is arranged on the rotor element so as to be capable of rotating in the axial direction, situated opposite the stator element. The induction element may have been produced from solid material or from a conductor on a printed circuit board. The induction element can also be made available by means of recesses in a solid material, such as milled cuts for instance, or as a stamped part.

According to one embodiment of the disclosure, the induction element covers substantially only one turn of a coil in the axial direction. The induction element and the turn of the coil may be arranged substantially in a plane orthogonal to the axial direction. The fact that the induction element and the turn overlap at least partially in the axial direction may be understood in such a way that they overlap at least partially when they are viewed in the axial direction. This may also be understood in such a way that they overlap at least partially in the case of projection in the axial direction onto a plane orthogonal to the axial direction.

In this way, the induction element only alters the inductance of at most one turn, and the rotation sensor is given maximal resolution. It is also possible that the rotor element includes several induction elements which, for instance, are arranged around the axis of rotation with the same spacing in the peripheral direction.

BRIEF DESCRIPTION OF THE DRAWINGS

Embodiments of the disclosure will be described below with reference to the appended drawings, in which connection neither the drawings nor the description are to be construed as limiting the disclosure.

The figures are merely schematic and not true to scale. Identical reference symbols designate identical or identically-acting elements in the figures.

DETAILED DESCRIPTION

Figure 1:
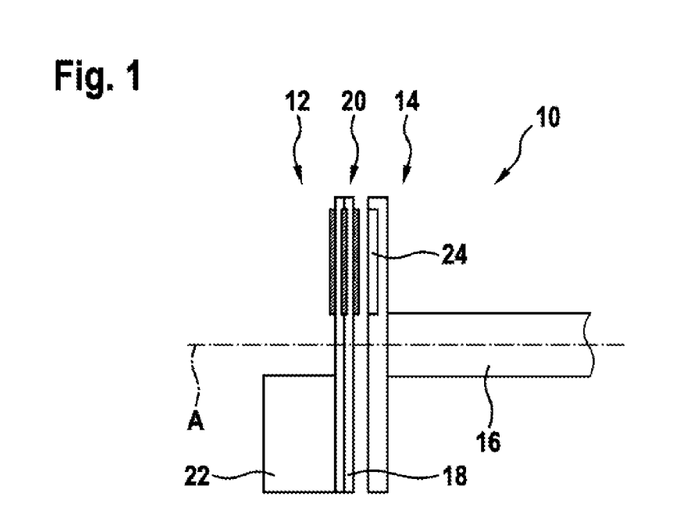
FIG. 1 shows schematically a rotation-angle sensor according to one embodiment of the disclosure.

FIG. 1 shows a rotation-angle sensor 10 consisting of a stator element 12 and a rotor element 14. The rotor element 14 may be fastened to a shaft 16 of a component such as a throttle valve, a motor, a camshaft, a gas pedal, etc., or may be provided by this shaft 16. The shaft 16 is capable of rotating about the axis A, and the stator element 12 is situated opposite the rotor element 14 in the corresponding axial direction. For instance, the stator element 12 is fastened to a housing of the component.

The stator element 12 includes a printed circuit board 18 on which a plurality of coils 20 are arranged in the plane of the printed circuit board 18. The printed circuit board 18 may be a multilayer printed circuit board 18, and the conductors of the coils 20 may be located on both sides of the printed circuit board 18 and between the individual layers of the printed circuit board 18. Further components for an evaluating unit 22 may be located on the printed circuit board 18. The evaluating unit 22 can supply each of the coils 20 with an alternating voltage and can also ascertain an induced alternating voltage in each of the coils 20. On the basis of these measurements, the evaluating unit 22 can determine a relative angle of rotation between the stator element 12 and the rotor element 14.

The rotor element 14 includes one or more induction elements 24 which are situated opposite the coils 20 in the axial direction. The induction elements 24 may, as shown in FIG. 1, be arranged on a further printed circuit board which is fastened to the shaft 16. It is also possible that the induction element(s) 24 is/are generated by machining one end of the shaft 16.

If the evaluating unit 22 supplies one or more of the coils 20 with alternating voltage, they generate a magnetic field which, in turn, induces eddy currents in the induction element 24 which has been manufactured from an electrically conductive material. These eddy currents, in turn, generate magnetic fields which interact with the coils 20 and change the inductance of the coils 20. On the basis of these changed inductances, the evaluating unit 22 can determine the angle of rotation.

Figure 2:
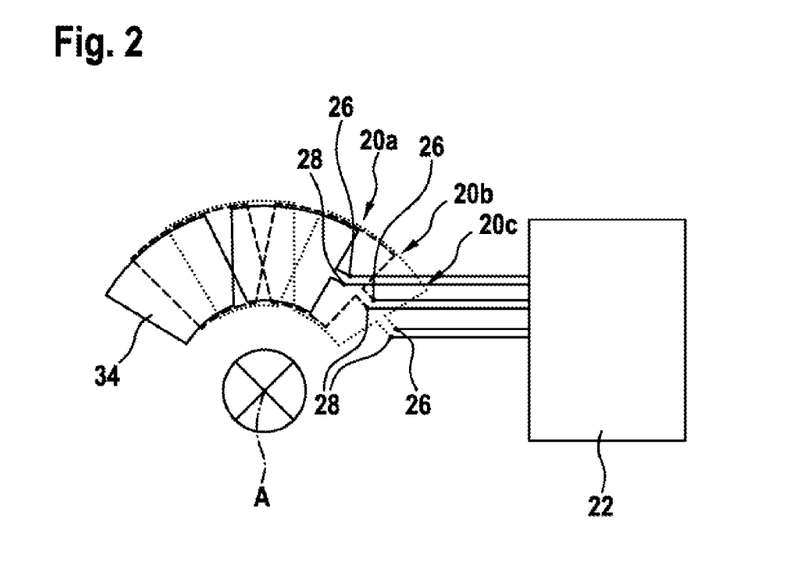
FIG. 2 shows schematically a rotation-angle sensor according to another embodiment of the disclosure.

FIG. 2 shows a rotation-angle sensor, the coils of which (a first coil 20a, a second coil 20b, a third coil 20c) cover merely an angular range around the axis A of less than 360° (here, about 120°). For better clarity, each of the coils does not cover the complete angular range.

The three coils 20a, 20b, 20c are connected to the evaluating unit 22 at first terminals 26 and second terminals 28 and are cyclically supplied there with an alternating voltage by the evaluating unit 22. For instance, within a cycle consisting of three steps firstly the first coil 20a, then the second coil 20b, and then the third coil 20c, are supplied with an alternating voltage, the other two coils remaining currentless. By virtue of the rotation-angle-dependent position of the induction element 24 (not represented here), the three coils 20a, 20b, 20c couple with variable intensity, depending on the angle of rotation, with the induction element 24 and therefore also with one another. Consequently, depending upon the angle of rotation in the currentless coils, alternating voltages are induced, the magnitude and/or phase of which can be ascertained. For instance, in these coils an alternating current or, to be more exact, a magnitude and/or a phase of this alternating current can be measured, from which the voltage or, to be more exact, the magnitude and/or phase thereof can be derived.

Within a cycle, for three different configurations of one energized and two currentless coils 20 two different magnitudes and/or phases are consequently ascertained in each instance, from which the evaluating unit 22 can then calculate the current angle of rotation.

Alternatively, within a cycle consisting of three steps the evaluating unit 22 can firstly supply the first coil 20a and the second coil 20b, then the second coil 20b and the third coil 20c, and then the third coil 20b and the first coil 20a, with two alternating voltages. In the remaining coil an alternating voltage is then induced, from the magnitude and/or phase of which the angle of rotation can then be determined.

In addition to the angle of rotation, the spacing of the induction element 24 or of the rotor element 14 from the sensor element 12 in the axial direction can also be determined from the ascertained phases and/or magnitudes of the induced alternating voltage(s), for instance by averaging over several cycles.

FIG. 2 further shows that the three coils 20a, 20b, 20c are designed as planar coils with several turns 34 situated in one plane. The coils 20a, 20b, 20c are arranged on the stator element 12, offset relative to one another in the peripheral direction. Viewed along the axial direction or in top view, they overlap at least partially along the peripheral direction.

Figure 3A:
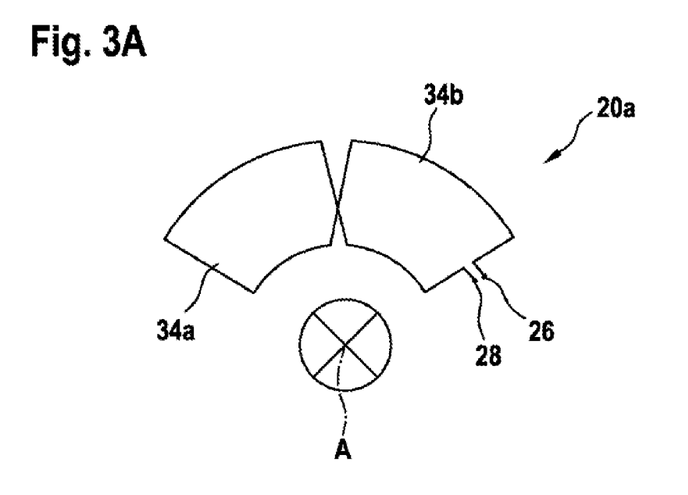
FIGS. 3A, 3B and 3C show schematically coil layouts for the rotation-angle sensor from FIG. 2.
Figure 3B:
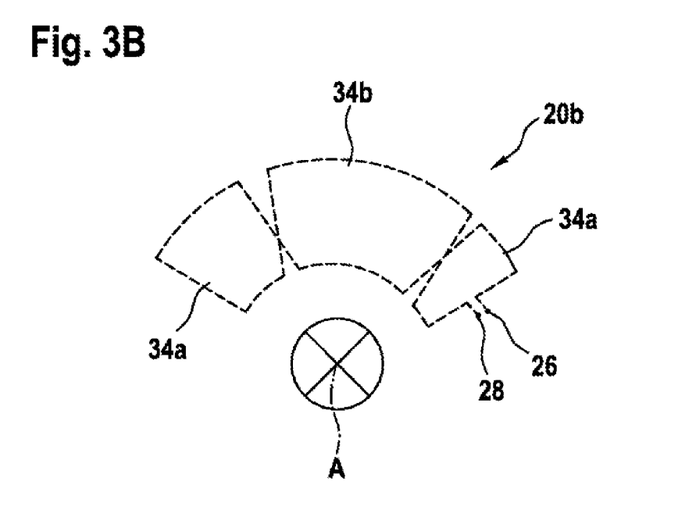
Figure 3C:
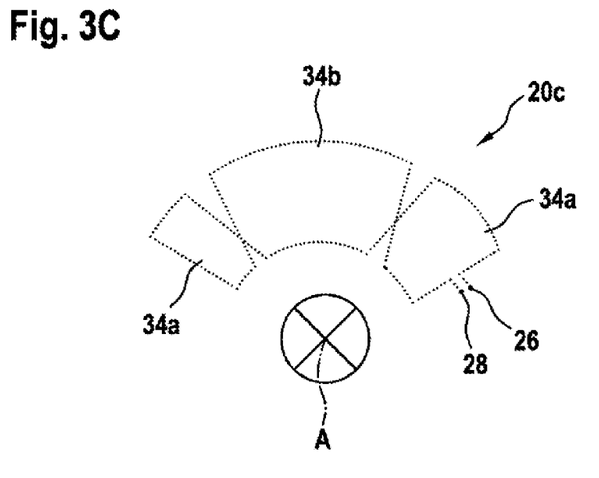

FIGS. 3A, 3B and 3C show, schematically, possible coil layouts for the three coils 20a, 20b, 20c. Coil 20a from FIG. 3A comprises, one in each case, a first turn 34a and a second turn 34b. Both turns 34a, 34b are the same size or circulate the same surface area. The two turns are offset in relation to one another along the peripheral direction.

Coils 20b and 20c from FIGS. 3B and 3C each comprise two first turns 34a and one second turn 34b. The second turn 34b is arranged in the peripheral direction between the first turns 34a. The first turns 34a are different in size and/or each smaller than the second turn 34b. The sum of the surface areas enclosed by the first turns 34a corresponds to the surface area enclosed by the second turn 34b.

The coils 20a, 20b, 20c shown in FIGS. 3A, 3B and 3C can be integrated within a rotation-angle sensor in such a way that they overlap one another completely. Each of the coils 20a, 20b, 20c in this case is supplied with an individual alternating voltage V1, V2, V3, as shown in FIG. 2. In this way, the turns 34a, 34b of coils 20b, 20c, which circulate surface areas of different sizes, are offset in relation to the turns 34a, 34b of coil 20a, so that a turn 34a, 34b of a coil 20a, 20b, 20c is in each instance always only partially covered by a turn 34a, 34b of another coil. In this way, a maximal angular resolution for the angular range covered by the three coils 20a, 20b, 20c can be achieved.

Each of the coils 20a, 20b, 20c comprises counter-circulating turns which can be subdivided into first turns 34a with a first orientation and into second turns 34b with a second, counter-circulating orientation. The turns 34a, 34b of each coil are arranged succeeding one another around the axis A in the peripheral direction, so that a chain of turns with alternating orientation arises.

The first turns 34a and the second turns 34b each circulate the same surface area, so that, although a homogeneous (interference) magnetic field through each of the coils 20a, 20b, 20c generates a current in the respective turn 34a, 34b, the individual currents in a coil 20a, 20b, 20c cancel one another out.

Figure 4:
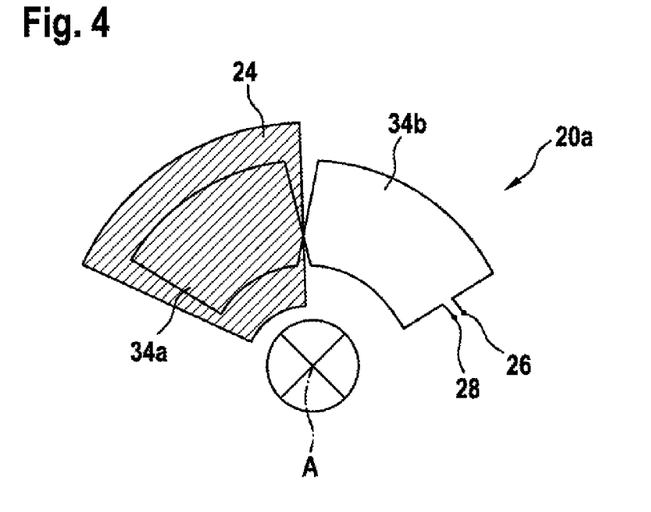
FIG. 4 shows an induction element for the rotation-angle sensor from FIG. 2.

FIG. 4 shows an induction element 24 and, for reasons of clarity, only one coil, the first coil 20a. However, the following remarks may also apply to the second coil 20b and the third coil 20c. As FIG. 4 shows, the induction element 24 is approximately as large as a turn—that is to say, it covers, viewed from the axial viewpoint or in a projection along the axial direction, approximately the same surface area along the periphery. Each of the turns 34a, 34b generates a magnetic field which, in turn, generates in the induction element 24 eddy currents which, in turn, generate a magnetic field, which generates currents in the respective turn and in this way changes the inductance of the respective turn 34a, 34b and consequently the total inductance of the coil 20a, 20b, 20c. Depending on the angular position of the rotor element 14 with the induction element, the inductance of the coils 20a, 20b, 20c consequently changes. Since the first turns 34a and the second turns 34b of the various coils 20a, 20b, 20c are arranged offset relative to one another, in addition the induction element 24 alters the inductances of each coil 20a, 20b, 20c differently, so that a good angular resolution of the rotation-angle sensor 10 arises.

Figure 5:
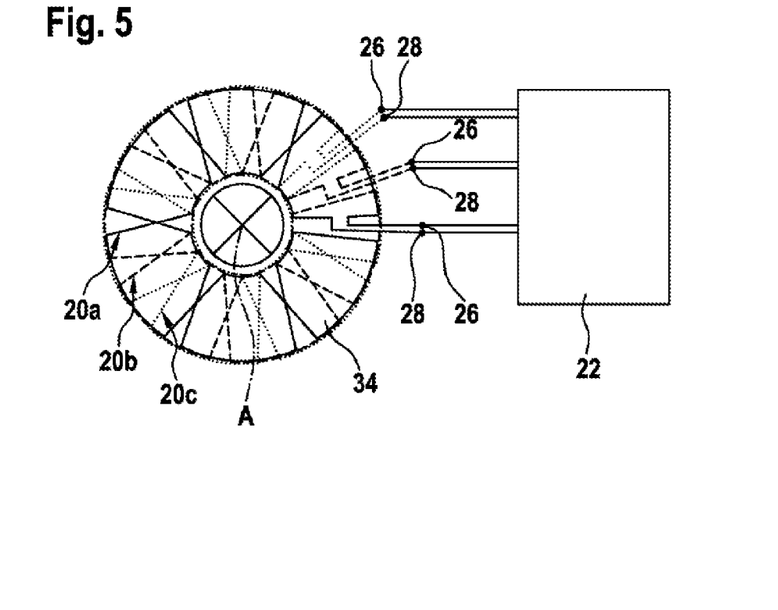
FIG. 5 shows schematically a rotation-angle sensor according to another embodiment of the disclosure.
Figure 6A:
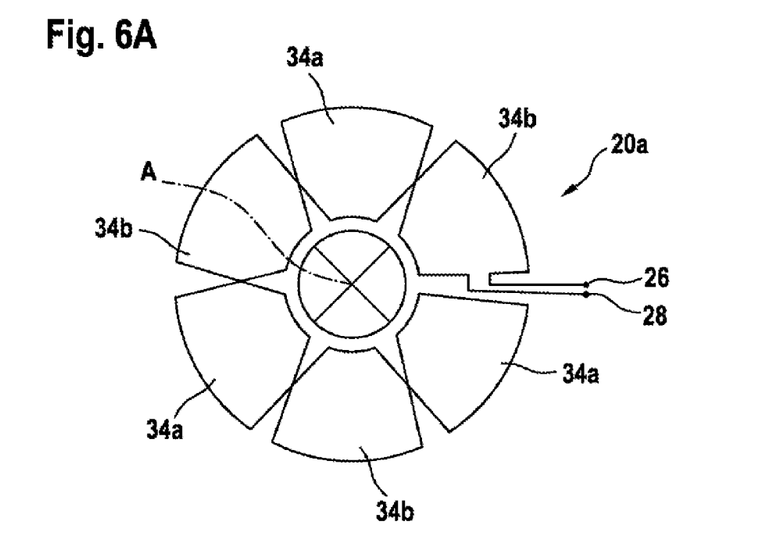
FIGS. 6A, 6B and 6C show schematically coil layouts for the rotation-angle sensor from FIG. 5.
Figure 6B:
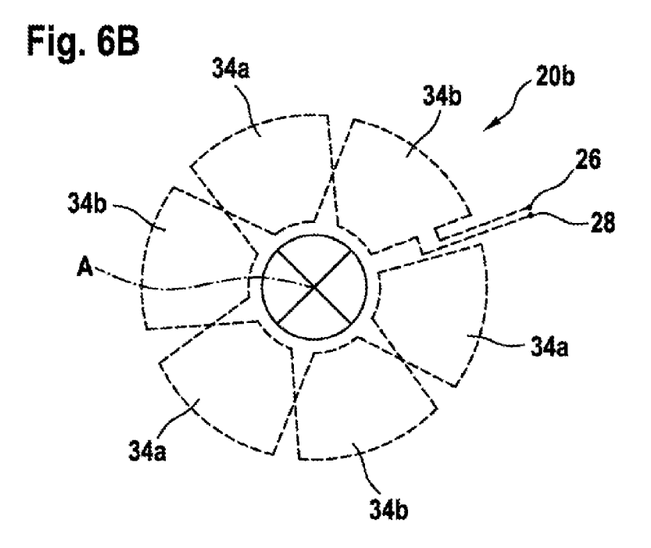
Figure 6C:
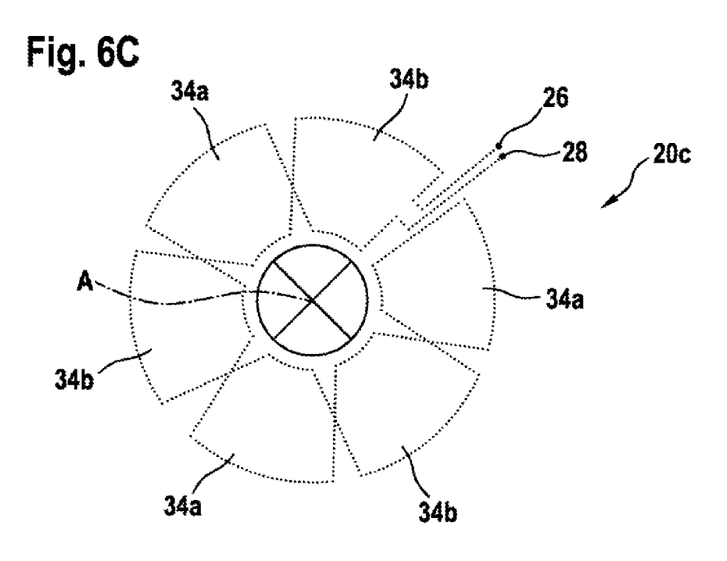
Figure 7:
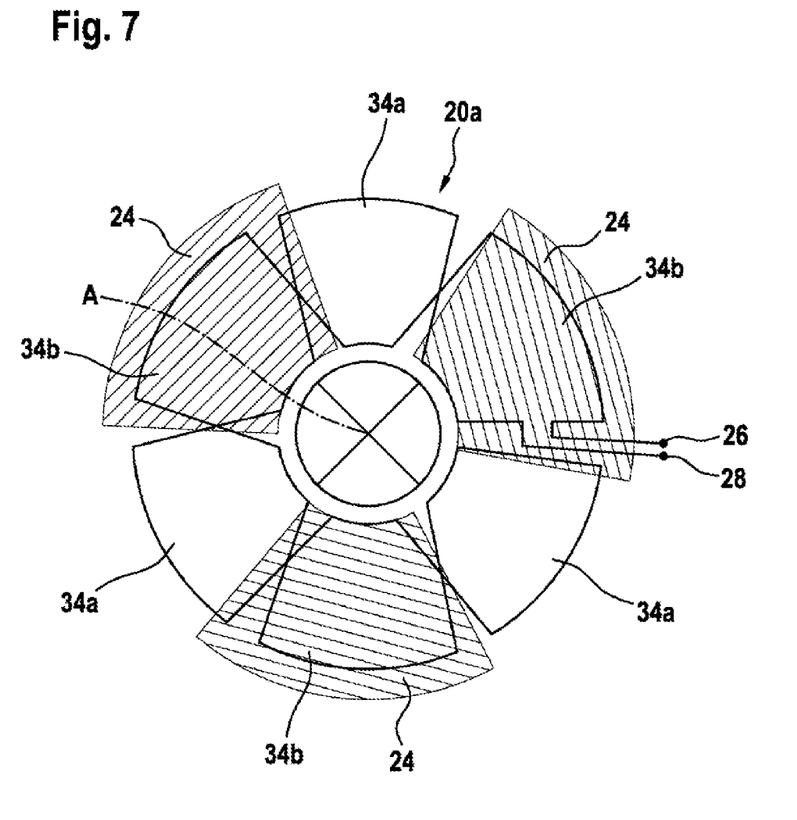
FIG. 7 shows induction elements for the rotation-angle sensor from FIG. 5.

FIGS. 5 to 7 show representations analogous to FIGS. 2 to 4. Unless otherwise described, the remarks relating to FIGS. 2 to 4 apply correspondingly.

In FIGS. 5 to 7 a rotation-angle sensor 10 is shown, the first coil 20a, second coil 20b and third coil 20c of which completely surround the sensor element 12. The coils 20a, 20b, 20c are of identical construction. In the same way as in FIG. 2, the coils 20a, 20b, 20c are arranged on the stator element 12 offset relative to one another. The six turns, in each instance, 34a, 34b of the coils 20a, 20b, 20c all circulate the same surface area in each instance, in order to compensate external interference fields. The number of turns is not restricted to six but should be an even number in order to compensate interference fields. The periodicity of the sensor results from the number of turns and the aperture angle.

In FIGS. 5 to 7 a rotation-angle sensor 10 is shown, the first coil 20a, second coil 20b and third coil 20c of which completely surround the sensor element 12. The coils 20a, 20b, 20c are of identical construction. In the same way as in FIG. 2, the coils 20a, 20b, 20c are arranged on the stator element 12 offset relative to one another. The six turns, in each instance, 34a, 34b of the coils 20a, 20b, 20c all circulate the same surface area in each instance, in order to compensate external interference fields. The number of turns is not restricted to six but should be an even number in order to compensate interference fields. The periodicity of the sensor results from the number of turns and the aperture angle.

FIG. 7 shows that three induction elements 24 may also be arranged on the rotor element 14. By virtue of the three induction elements 24, offset by 120° relative to one another, which each cover approximately one turn 34a, 34b, a better compensation of tolerances may result in the case of a uniqueness range of 120°. In this connection, merely the first coil 20 and the induction element 24 are represented in exemplary manner in the figure, in order to make the figure clearer and to represent the interaction of the induction element 24 and the coils 20a, 20b, 20c. The second coil 20b and the third coil 20c are arranged rotated in relation to the first coil 20a.

Figure 8A:
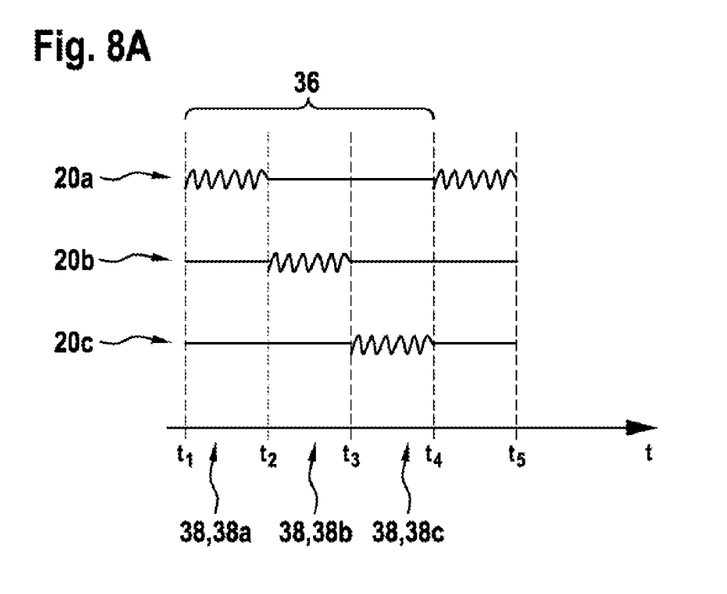
FIG. 8A shows an energizing scheme for a rotation-angle sensor according to one embodiment of the disclosure.

FIG. 8A shows a diagram with an energizing cycle 36 for the coils 20a, 20b, 20c of the rotation-angle sensor from FIG. 2 or 5. The cycle 36 consists of three equally long steps 38 (of the order of magnitude of one millisecond). In general, the number of steps 38 is equal to the number of coils.

During the first step 38a, the first coil 20a is supplied with alternating voltage—that is to say, it serves as transmitting coil or excitation coil. The other two coils (second coil 20b and third coil 20c) are not energized, but the alternating voltage generated in them is ascertained. That is to say, the other two coils 20b, 20c serve as receiving coils.

In the following steps, the roles of the coils are cyclically interchanged. In the second step 38b, the second coil 20b serves as transmitting coil, and the first coil 20a and also the third coil 20c serve as receiving coils. In the third step 38c, the third coil 20c serves as transmitting coil, and the first coil 20a and also the second coil 20b serve as receiving coils. Subsequently the next cycle begins again with the first step 38, 38a.

By virtue of the design of the coils 20a, 20b, 20c as planar coils with counter-circulating turns 34, upon application of an alternating voltage to the first coil 20a (without induction element 24), for instance, alternating electromagnetic fields of differing sign are generated in the turns 34 in each instance. Since the enclosed surface areas of clockwise-circulating and counterclockwise-circulating turns 34 are of equal size in each instance, the fields cancel each other out toward the outside, and no voltage is induced in the other coils (that is to say, here, in the second coil 20b and in the third coil 20c). Now if a part of the transmitting-coil surface is shielded by the induction element 24, the subfields no longer cancel each other out, and a voltage is induced in the other two coils (second coil 20b, third coil 20c). By virtue of the cyclical interchanging of the transmitting coils and receiving coils, a back-calculation with respect to the angle of rotation is possible, and a compensation of a varying spacing between the stator element 12 and the rotor element 14 in the axial direction, for instance by reason of mechanical tolerances, is possible.

Figure 8B:
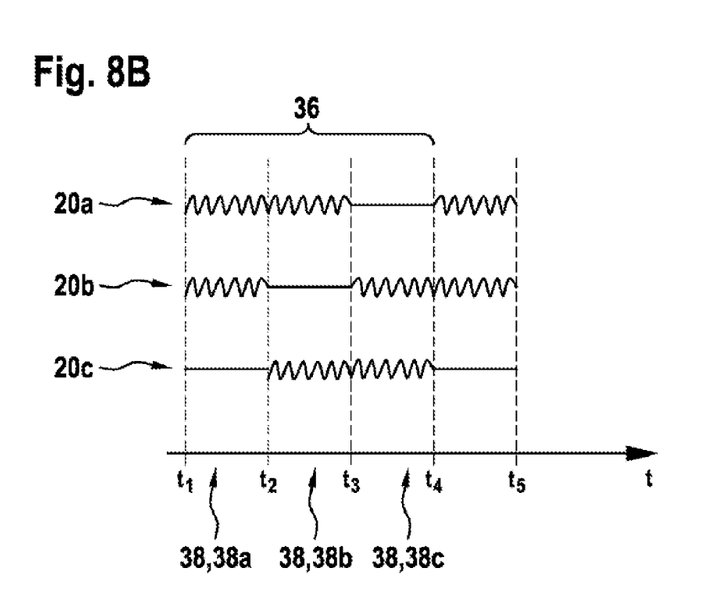
FIG. 8B shows an energizing scheme for a rotation-angle sensor according to another embodiment of the disclosure.

FIG. 8B shows a diagram with a further energizing cycle 36 for the coils 20a, 20b, 20c of the rotation-angle sensor from FIG. 2 or 5, in which two coils are energized in each instance per step 38.

In the first step 38a, the first coil 20a and the second coil 20b serve as transmitting coils, and the third coil 20c serves as receiving coil. In the second step 38b, the coils first coil 20a and the third coil 20c serve as transmitting coils, and the second coil 20b serves as receiving coil. In the third step 38c, the second coil 20b and the third coil 20c serve as transmitting coils, and the first coil 20a serves as receiving coil.

The respectively energized transmitting coils can be supplied with two differing alternating voltages having differing frequencies, which, depending on the angle of rotation, induce in the receiving coil an alternating voltage that has two components with the two frequencies. These components can, for instance, be separated from one another by Fourier analysis, and from this the magnitude and/or the phase of the component voltages can be ascertained.

In conclusion, it should be pointed out that terms such as "exhibiting", "including" etc., do not exclude other elements or steps, and terms such as "a" or "an" do not exclude a plurality. Reference symbols in the claims are not to be regarded as a restriction.

The invention claimed is:

1. A rotation-angle sensor comprising:
   a stator element including at least three coils;
   a rotor element, rotatably mounted with respect to the stator element, and configured to couple inductively with variable intensity, depending on an angle of rotation between the rotor element and the stator element, with each of the at least three coils; and
   an evaluating unit configured to:
      supply the at least three coils cyclically in succession with alternating voltage, so that in each instance a first portion of the at least three coils is supplied with alternating voltage, and a remaining portion is left currentless by the evaluating unit;
      ascertain, cyclically in succession, in each instance at least one of a phase and a magnitude of an induced alternating voltage in one or more currentless coils; and
      determine the angle of rotation between the rotor element and the stator element with reference to the at least one of the phase and magnitude of the induced alternating voltage in the one or more currentless coils.

2. The rotation-angle sensor as claimed in claim 1, wherein the evaluating unit is further configured to simultaneously supply at least two coils from the first portion of the at least three coils with differing alternating voltages.

3. The rotation-angle sensor as claimed in claim 1, wherein the evaluating unit is further configured to supply different coils from the first portion of the at least three coils with alternating voltages having at least one of differing frequencies, differing phases, and differing magnitudes.

4. The rotation-angle sensor as claimed in claim 1, wherein, in each instance, the evaluating unit is further configured to:
   only supply one coil with alternating voltage; and
   ascertain at least one of a magnitude and a phase of an induced alternating voltage in the remaining coils; or
wherein, in each instance, the evaluating unit is configured to:
   ascertain the at least one of the magnitude and the phase of the induced alternating voltage in only one coil; and
   supply the remaining coils with the alternating voltage.

5. The rotation-angle sensor as claimed in claim 1, wherein the evaluating unit is further configured to determine an axial spacing between the stator element and the rotor element with reference to the at least one of the magnitude and the phase of the induced alternating voltage.

6. The rotation-angle sensor as claimed in claim 1, wherein at least one of:
   the at least three coils are planar coils; and
   the at least three coils are arranged at least one of on and in a printed circuit board.

7. The rotation-angle sensor as claimed in claim 1, wherein at least one of:
   the at least three coils mutually overlap one another at least partially in an axial direction; and
   each of the at least three coils includes at least two turns succeeding one another in the peripheral direction.

8. The rotation-angle sensor as claimed in claim 1, wherein:
   each of the at least three coils respectively includes at least one first turn and at least one second turn; and
   at least one of:
      the at least one first turn and the at least one second turn are oriented in counter-circulating manner;
      the at least one first turn and the at least one second turn are arranged alternately on one another along a peripheral direction of the stator element; and
      a surface area circulated by the at least one first turn is equal to a surface area circulated by the at least one second turn.

9. The rotation-angle sensor as claimed in claim 7, wherein at least one of:
  the at least two turns of each coil circulate differently-sized surfaces; and
  the at least two turns are arranged offset relative to one another.

10. The rotation-angle sensor as claimed in claim 1, wherein:
  the at least three coils are arranged within an angular range of the stator element; or
  each of the at least three coils completely encircles the stator element.

11. The rotation-angle sensor as claimed in claim 1, wherein:
  the rotor element includes at least one induction element; and
  at least one of:
    the at least one induction element is arranged within an angular range of the rotor element; and
    the at least one induction element covers only one turn of one of the at least three coils in the axial direction.

* * * * *